United States Patent
Nania (10) Patent No.: US 9,434,317 B2
(45) Date of Patent: Sep. 6, 2016

(54) VEHICLE STEP SYSTEM

(71) Applicant: Ford Global Technologies, LLC, Dearborn, MI (US)

(72) Inventor: Adrian Nania, Rochester, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/540,553

(22) Filed: Nov. 13, 2014

(65) Prior Publication Data

US 2016/0137134 A1    May 19, 2016

(51) Int. Cl.
*B60R 19/00* (2006.01)
*B60R 3/02* (2006.01)
*B60R 19/48* (2006.01)

(52) U.S. Cl.
CPC *B60R 3/02* (2013.01); *B60R 19/48* (2013.01)

(58) Field of Classification Search
CPC ....... B60R 19/14; B60R 19/38; B60R 19/48; B60R 11/06; B60R 3/02
See application file for complete search history.

(56) References Cited

U.S. PATENT DOCUMENTS

| | | | | |
|---|---|---|---|---|
| 1,360,369 A | * | 11/1920 | Cohen | B60R 19/14 293/150 |
| 1,437,648 A | * | 12/1922 | Gore | B60R 3/02 105/341 |
| 2,700,572 A | * | 1/1955 | Torrance | B62D 43/08 296/37.2 |
| 2,951,454 A | * | 9/1960 | Candlin, Jr. | B61D 23/02 105/447 |
| 3,164,394 A | * | 1/1965 | Husko | B60R 3/02 105/449 |
| 3,326,595 A | * | 6/1967 | Ogilvie | B60R 9/02 224/404 |
| 3,451,710 A | * | 6/1969 | Savell | B60R 19/14 224/401 |
| 3,488,077 A | * | 1/1970 | Miller | B60P 3/36 224/402 |
| 3,533,654 A | * | 10/1970 | Kannegieter | B60R 19/38 108/132 |
| 3,623,764 A | * | 11/1971 | Jacobus | B60J 5/103 16/232 |
| 3,980,319 A | | 9/1976 | Kirkpatrick | |
| 4,225,167 A | * | 9/1980 | Buettner | B60R 19/14 293/120 |

(Continued)

*Primary Examiner* — Brodie Follman
(74) *Attorney, Agent, or Firm* — Burgess Law Office, PLLC; Raymond I. Coppiellie (57) ABSTRACT

A vehicle step system and method incorporating an end of a vehicle bumper. The step system includes an end of the bumper movable between a first, closed position and a second, open position. When placed in the second, open position the end of the bumper includes a step surface. One example of the vehicle step system and method includes positioning the step surface below the top of the bumper. The end of the bumper may be pivotally connected at the bottom wherein an actuator operates to move the end of the bumper between the first, closed position and the second, open position. In an additional example, a latch operates to prevent movement of the end of the bumper.

19 Claims, 5 Drawing Sheets

(56) References Cited

U.S. PATENT DOCUMENTS

| | | | | |
|---|---|---|---|---|
| 4,266,818 A * | 5/1981 | Hightower | ............. | B60R 19/14 188/371 |
| 4,440,364 A * | 4/1984 | Cone | ......... | B64C 1/24 16/282 |
| 4,514,002 A | 4/1985 | McIntosh | | |
| 4,570,986 A * | 2/1986 | Sams | ................. | B60R 19/48 224/402 |
| 4,750,753 A * | 6/1988 | Dezern | ................ | B60R 3/02 224/497 |
| 5,085,450 A * | 2/1992 | DeHart, Sr. | ............. | B60R 3/02 280/166 |
| 5,538,265 A * | 7/1996 | Chen | .............. | B60R 3/02 280/163 |
| 5,678,872 A * | 10/1997 | Slater | ............. | B60R 3/02 292/35 |
| 6,149,181 A * | 11/2000 | Biederman | .......... | B60D 1/485 280/491.1 |
| 6,270,099 B1 * | 8/2001 | Farkash | ............... | B60R 3/002 182/127 |
| 6,511,086 B2 | 1/2003 | Schlicht | | |
| 6,685,204 B1 | 2/2004 | Hehr | | |
| 6,840,526 B2 * | 1/2005 | Anderson | .............. | B60R 3/02 182/127 |
| 7,377,563 B1 * | 5/2008 | Demick | .............. | B60R 3/02 280/164.1 |
| 7,416,232 B2 * | 8/2008 | Tier | .................. | B60R 3/00 280/163 |
| 7,431,118 B1 * | 10/2008 | Hogg | .................... | B62J 25/00 180/219 |
| 7,434,825 B2 * | 10/2008 | Williams | ............... | B60R 3/02 280/163 |
| 7,448,637 B2 | 11/2008 | Parker | | |
| 7,503,572 B2 | 3/2009 | Park | | |
| 7,516,997 B2 | 4/2009 | Kuznarik | | |
| 8,038,195 B1 * | 10/2011 | Hutcheson | ............. | B60R 9/00 296/136.04 |
| 8,070,196 B2 * | 12/2011 | Couto | ................. | B60R 19/48 293/118 |
| 8,245,996 B1 * | 8/2012 | Ciabaszewski | ....... | B60R 13/105 248/286.1 |
| 8,366,129 B2 * | 2/2013 | Salmon | ................ | B60R 3/02 280/163 |
| 8,573,660 B2 * | 11/2013 | Cha | ...................... | B60R 19/48 224/489 |
| 8,602,467 B2 * | 12/2013 | Lee | ..................... | B60R 19/48 293/106 |
| 8,696,005 B2 * | 4/2014 | Kim | ...................... | B60R 3/02 280/163 |
| 8,905,354 B2 * | 12/2014 | Griffiths | ............... | B64C 1/24 182/89 |
| 2007/0290515 A1 * | 12/2007 | Doan | ................... | B60R 19/38 293/119 |
| 2008/0106106 A1 * | 5/2008 | Lavoie | ................. | B60R 19/48 293/117 |
| 2010/0025955 A1 | 2/2010 | Carr, Jr. | | |
| 2014/0001726 A1 * | 1/2014 | Statz | ................... | B60R 3/02 280/166 |

* cited by examiner

VEHICLE STEP SYSTEM

CROSS-REFERENCE TO RELATED APPLICATIONS

Not Applicable

BACKGROUND OF THE INVENTION

1. Field of the Invention

The present invention relates generally to a step used for entering and exiting a vehicle; and more specifically, to a vehicle bumper including a step.

2. Description of Related Art

Vehicles such as trucks and SUV's often have a relatively high ground clearance. While having its advantages, a relatively high ground clearance has a downside in that it can make access to the vehicle cabin, box or bed of a pickup truck, cargo area, or roof rack challenging. To provide ease of access, many of vehicles have some type of fixed running board, foldaway, or extendable/retractable step.

In particular, the box or bed of a pickup truck also has a relatively high ground clearance, which often makes access difficult. Typically, when the tailgate is in an up or closed position a user steps on the bumper or wheel of the vehicle climbs over the sidewall of the box or bed. Depending upon vehicle ground clearance it may be difficult for a user to place his or her foot on the bumper or wheel and climb or step over the sidewall of the box or bed.

Steps connected to the towing receiver or located under the bumper may also be used. However, placing the tailgate in the down or open position often obscures or obstructs access to such steps as the tailgate typically extends rearwardly over the towing receiver. Further, in the open position the tailgate is located over and just above the vehicle bumper reducing access to the bumper as a step from the rear.

SUMMARY OF THE INVENTION

A vehicle step system and method incorporating an end of a vehicle bumper. The step system includes an end of the bumper movable between a first, closed position and a second, open position. The second, open position includes a step surface. In one example, the end of the bumper pivotally connects to the bottom of the bumper and an actuator operates to move the end of the bumper between the first, closed position and the second, open position. In an additional example, a latch operates to prevent movement of the end of the bumper.

In a further example, when located in the second, open position the end of the bumper includes a step surface, the step surface positioned below the top of the bumper.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
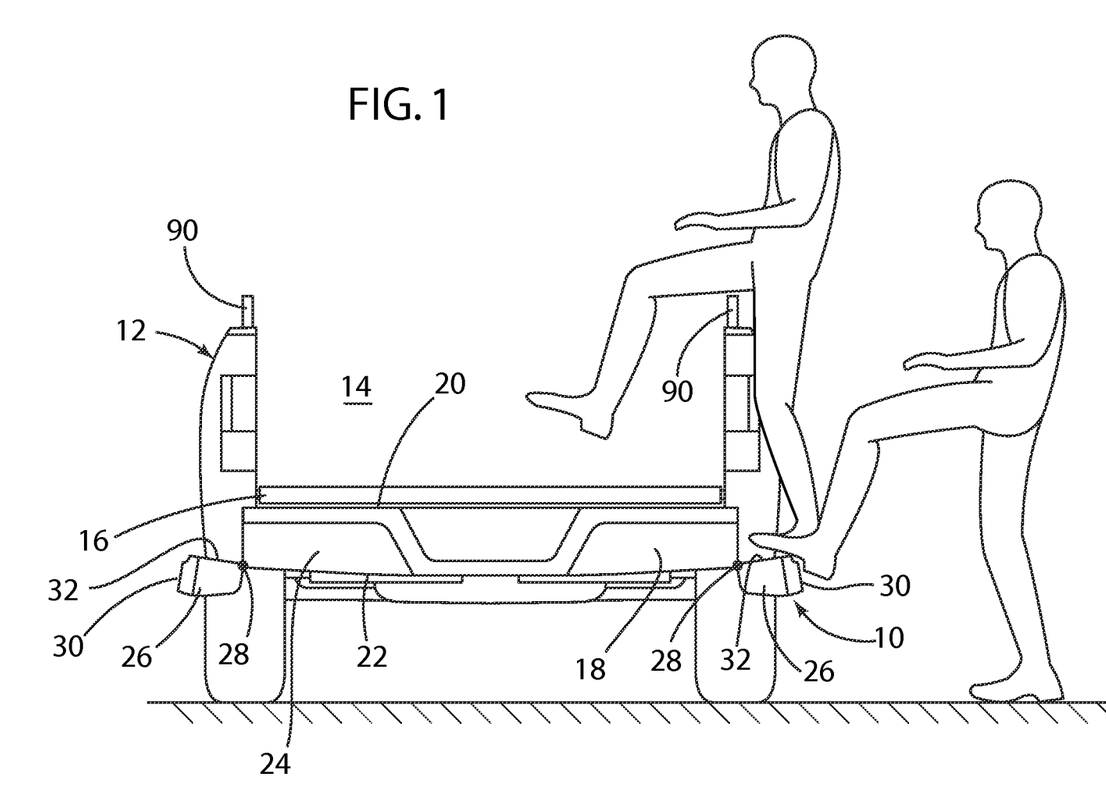
FIG. 1 is a rear view of showing a vehicle step assembly according to one example of the present invention.
Figure 2A:
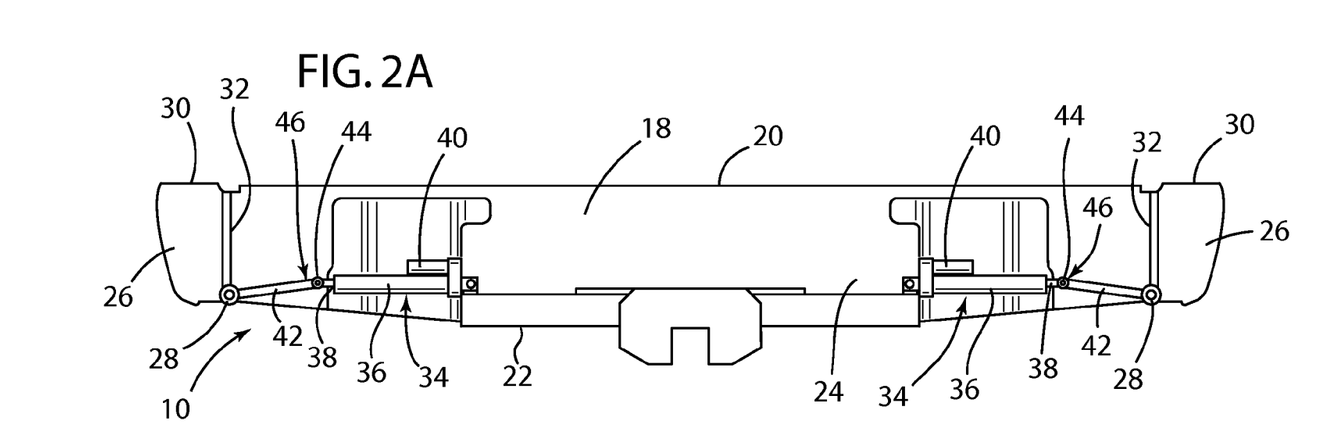
FIG. 2A is a rear schematic view of the vehicle step assembly of FIG. 1, with portions removed for clarity, illustrating the assembly in a closed position.
Figure 2B:
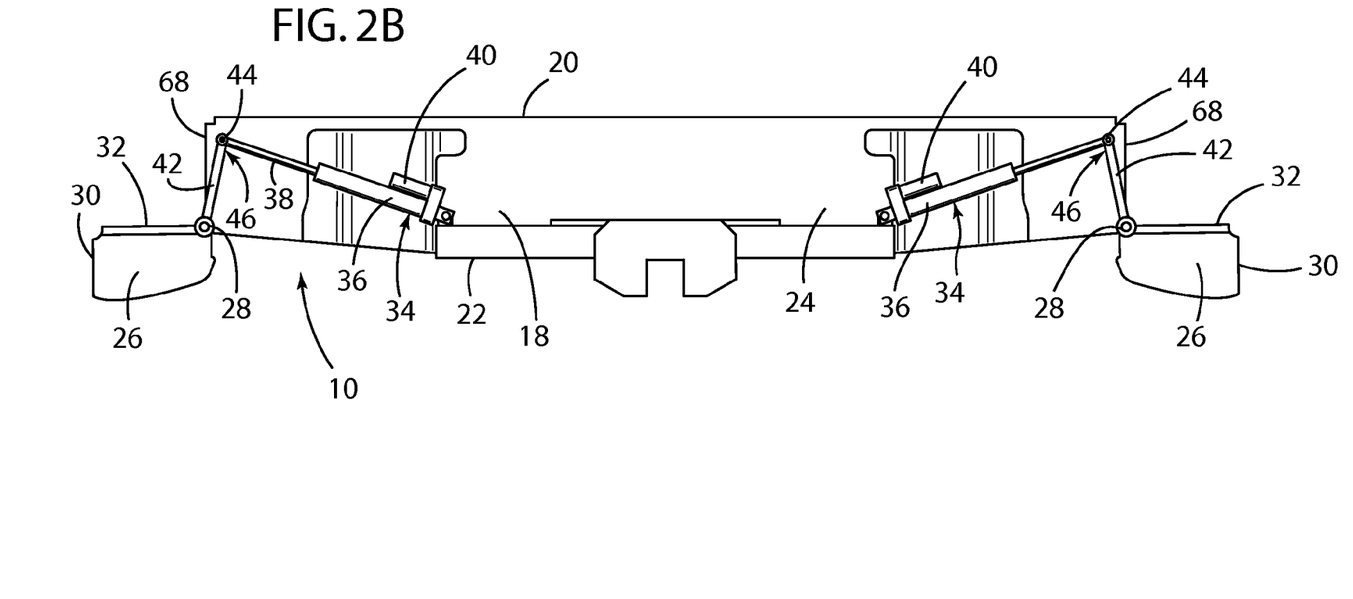
FIG. 2B is a rear schematic view of the vehicle step assembly of FIG. 1, with portions removed for clarity, illustrating the assembly in an open position.

FIGS. 1 and 2A-2B illustrate a vehicle step system, seen generally at 10, for a vehicle 12. In the disclosed embodiment, the vehicle is a pickup truck 12 wherein the step system 10 provides access to the bed or box 14 of the truck 12. The step system 10 may also provide access to other types of vehicles such as SUVs, vans and other utility vehicles. The step system 10 may also provide access to vehicle roof racks or cargo areas.

One example of the step system 10 includes a bumper 18 having a top or upper side 20, a bottom or lower side 22, a rear side or face 24, and a pair of pivotable ends 26. A hinge 28 at the bottom or lower side 22 and extends substantially parallel to the top 20 of the bumper 18 forms a pivot axis for the pivotable ends 26. The pivotable ends 26 move between a first, closed position, see FIG. 2A, and a second, open position, see FIG. 2B. In the first, closed position, the top side 30 of the end 26 remains substantially parallel to the top 20 of the bumper 18 and the bumper appears as a continuous bumper 18. In the second, open position, the top side 30 of the pivotable end 26 extends transverse to the top 20 or longitudinal axis of the bumper 18 and exposes the step surface 32. The pivotable ends 26 of the bumper 18 rotate or pivot about the hinge 28 to expose the step surface 32, located or positioned at a height less than that of the top 20 of the bumper 18.

FIGS. 2A-2B illustrate one example of an actuator mechanism, seen generally at 34, for moving the pivotable end 26 from the first, closed position to the second, open position. The actuator mechanism 34 includes an actuator 36 having a shaft or rod 38 and motor 40. The motor 40 operates to extend or retract the shaft or rod 38 in a linear manner. A lever arm 42 fixed to the pivotable end 26 controls movement of the pivotable end 26. Pivot pin 44 pivotally connects a free end 46 of the shaft arrived 38 to the lever arm 42 whereby movement of the shaft arrived 38 results in a corresponding movement of the pivotable end 26 about the pivot axis of the hinge 28.

As shown in FIG. 2A when the motor 40 retracts the shaft or rod 38, it draws the lever arm 42 inward towards the body of the actuator 36 and the bottom 22 of the bumper 18. Retracting the shaft or rod 38 moves the pivot pin 44 along a path or arc defined by the lever arm 42 and ultimately places the pivotable end 26 in the first, closed position. In the closed position, the top surface 30 of the pivotable end 26 is adjacent the top surface 20 of the bumper 18 and the pivot pin 42 is adjacent or near the bottom 22 of the bumper 18. As shown in FIG. 2B when the motor 40 drives the shaft or rod 38 outward it moves the pivot pin 44 and lever arm 42 in an upward and outward manner positioning the pivot pin 44 near the top 20 of the bumper 18. Positioning the pivot pin 44 near the top of the bumper 18 correspondingly places the pivotable end 26 in the second, open position and exposes the step surface 32.

Providing a pivotal end 26 and a corresponding step surface 32 improves ergonomics by providing intermediate height step. The pivotable ends 26 easily blend into the bumper ends and may include a wraparound portion, which extends and increases step size. Increasing the overall size and configuration of the step surface 32 provides increased entry flexibility, especially when a large load extends past the tailgate in a down position. Further, the step surface 32 is not viewable in the first, closed position wherein scuffed or dirty step surfaces are easily hidden.

Figures 3, 4A, 4B:
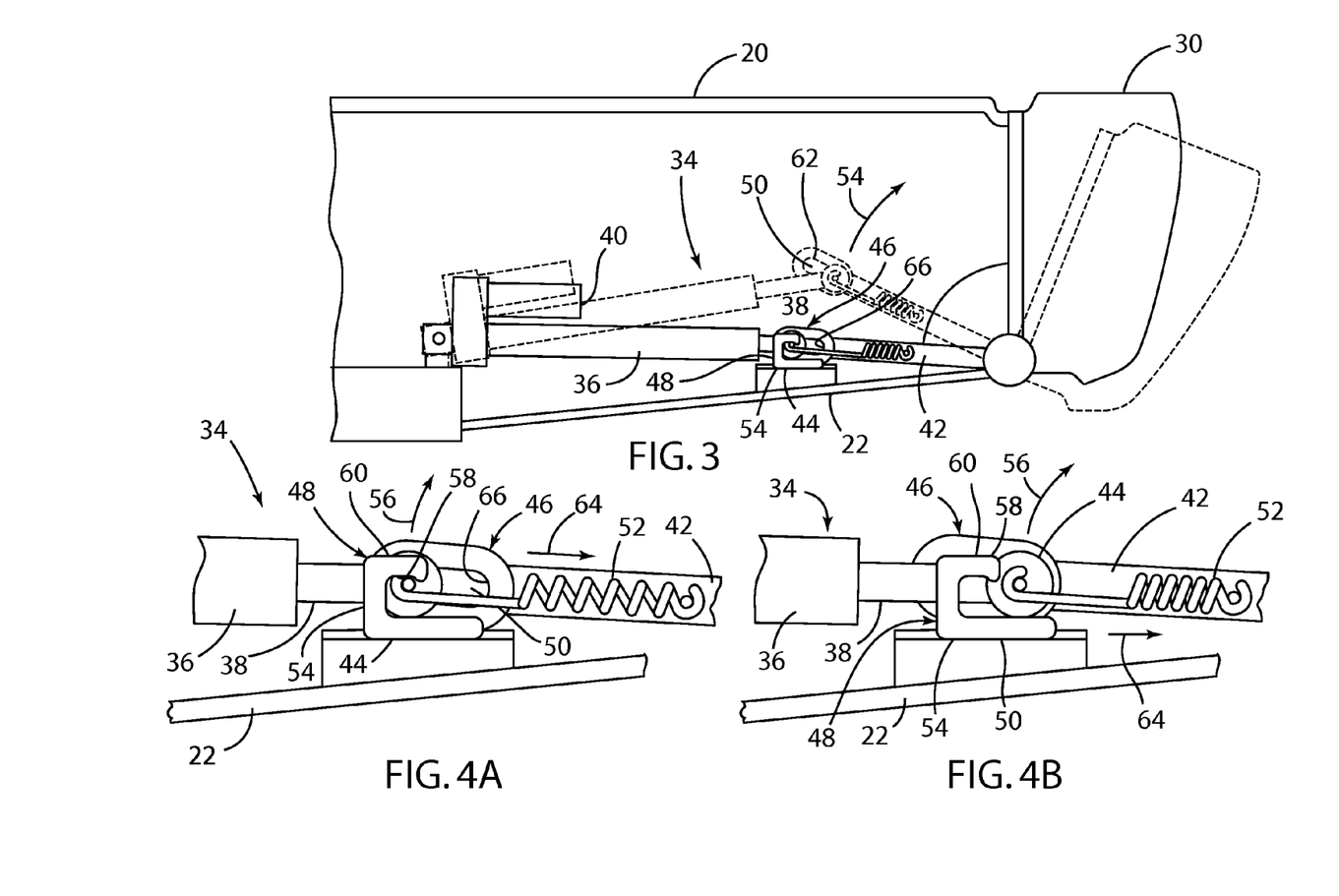
FIG. 3 is a partial rear schematic view of the vehicle step assembly of FIG. 1.
FIG. 4A is an enlarged partial rear schematic view of the vehicle step assembly of FIG. 1 illustrating the step in a closed, latched position.
FIG. 4B is an enlarged partial rear schematic view of the vehicle step assembly of FIG. 1 illustrating the step in a closed, unlatched position.

FIGS. 3 and 4A-4B show an additional example of the vehicle step system 10 including a latch assembly, seen generally at 48. As illustrated, the end of the lever arm 42 includes an elongated or oblong slot 50. The pivot pin 44 extends through the free end 46 of the shaft or rod 38 and the elongated or oblong slot 50. A spring 52 attaches on one end thereof to the pivot pin 44 and on the opposite end thereof to the lever arm 42. A substantially C-shaped latch member 54 attached to the bumper 18 adjacent the bottom 22 thereof receives the pivot pin 44 and prevents movement of the lever arm 42 in the direction of the arrow 56. Specifically, when the pin 44 is located or positioned underneath or adjacent the lower surface or bottom side 58 of the upper arm 60 of the C-shaped member 54 the upper arm 58 prohibits pivotal movement of the lever arm 42. In this position, as shown in FIG. 4A, when the shaft or rod 38 is fully retracted, the spring 52 pulls the pivot pin 44 to the upper or top end 62 of the slot 50, with the upper or top end 62 of the slot 50 being that portion radially furthest from the hinge 28. As illustrated, the C-shaped latch member 54 may include a detent member 70 extending downwardly from the lower surface or bottom side 58 of the upper arm 60.

When the actuator mechanism 34 operates to move the lever arm 42 in the direction of the arrow 54 to position the pivotal end 26 in the second, open position exposing the step surface 32 it first moves the pivot pin 44 in the lateral direction illustrated by the arrow 64. Initially, as the shaft or rod 38 extends from the body of the actuator 36 the pivot pin 44 moves in the elongated or oblong slot 50 and the lever arm 42 remains stationary. The pivot pin 44 moves in the oblong slot 50 until it engages the lower or bottom end 66 of the slot 50 at which point it clears the upper arm 60 of the C-shaped latch member 54. Continued movement of the shaft or rod 38 of the actuator 36 causes the lever arm 42 to pivot about the hinge 28 correspondingly causing the pivotal end 26 to swing outwardly towards the second, open position exposing the step surface 32, see the dashed lines in FIG. 3. The spring 52 provides a suitable tensile force to maintain contact between the lower or bottom end 66 of the slot 50 and the pivot pin 44. In this example, the lever arm 42 may function as a stop limiting the travel of the pivotal end 26 by engaging an inner sidewall 68 of the bumper 18. The lever arm 42 transfers a load placed on the step surface 32 to the bumper 18; correspondingly, it does not act against the spring 52.

In an additional example, the lower surface or bottom side 58 of the upper arm 60 includes a detent member, shown as the downwardly extending protrusion or ledge 70. Initially, as illustrated in FIG. 4B, the actuator 36 draws the lever arm 42 downward until they are substantially in line with the pivot pin 44 in the lower or bottom end 66 of the slot 50, due to the tensile force applied by the spring 52. Continued inward movement of the shaft or rod 38 of the actuator 36 pulls the pivot pin 44, against the tensile force of the spring 52, toward the actuator 36, into the C-shaped latch member 54, past the ledge 70, and underneath the upper arm 60 of the C-shaped latch member 54. In the present example, the actuator 36 has sufficient power to pull the pivot pin 44 over and past the ledge 70. As illustrated in FIG. 4A the pivot pin 48 secures the lever arm 42 in position. In the present example, the spring 52 does not have enough tensile strength to pull the pivot pin 44 over the ledge 70 and out from under the upper arm 60 of the C-shaped latch member 54. Should the actuator 36 fail, the pivot pin 44 would remain under C-shaped latch member 54 and the pivotal end 26 would remain in the first, closed position.

In the present example, the actuator mechanism 34 may be activated in a variety of ways. One possibility is to activate the actuator mechanism 34 using a key FOB. Another possibility is a button installed on the dash of the vehicle 10. The actuator mechanism 34 may be tied into the vehicle operating system wherein if the pivotal end 26 is in the second, open position and the driver places the vehicle in gear the vehicle operating system provides a signal informing the operator that the pivotal and 36 is still in the open position. Other types of control systems for operating the vehicle step system 10 may also be used.

Figures 5A, 5B:
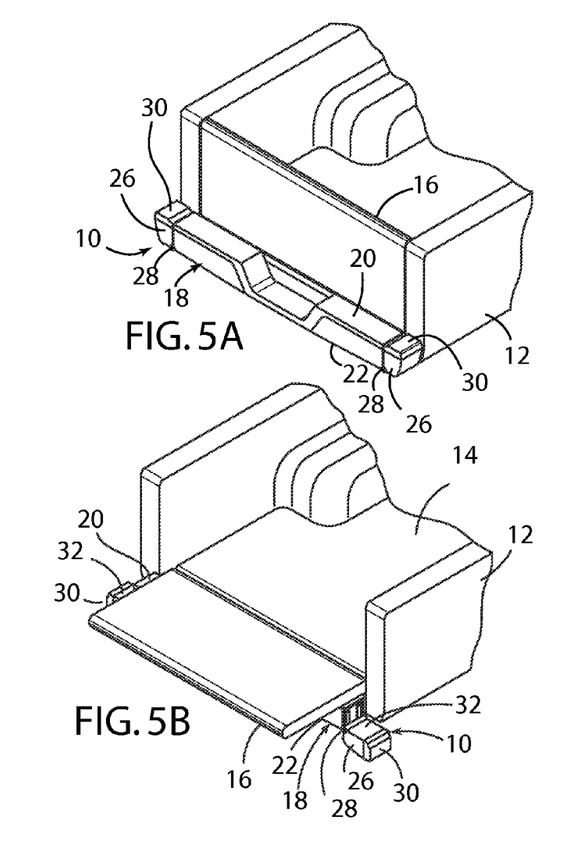
FIGS. 5A and 5B are schematic perspective views of the vehicle step assembly of FIG. 1 showing the vehicle step assembly in a closed position, FIG. 5A, and an open position, FIG. 5B.
Figures 6A, 6B:
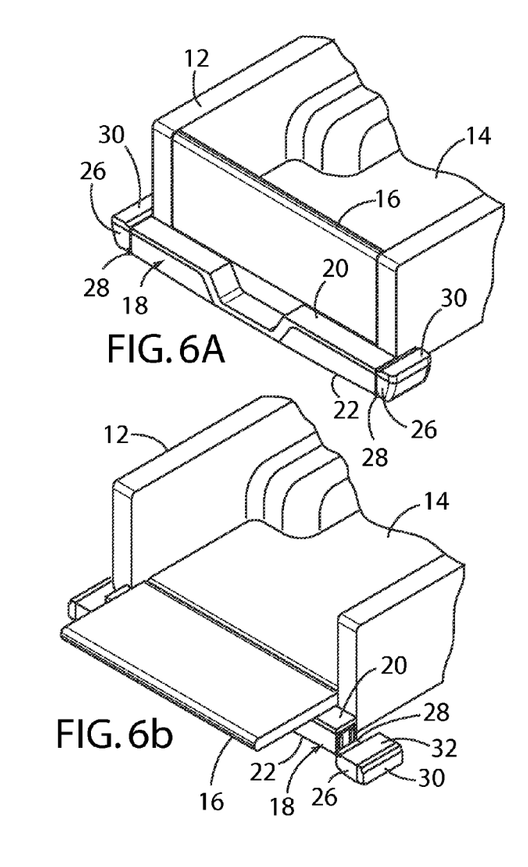
FIGS. 6A and 6B are schematic perspective views an additional embodiment of the vehicle step assembly of FIG. 1 showing the vehicle step assembly in a closed position, FIG. 6A, and an open position, FIG. 6B.

FIGS. 5A and 5B illustrate an example of a straight or inline bumper 18 having a vehicle step system 10 according to one example of the invention wherein FIG. 5A shows the vehicle step system 10 in a closed position, and FIG. 5B shows the vehicle step system 10 and an open position. FIGS. 6A and 6B illustrate a further example including a U-shaped bumper 18 wherein the pivotable ends 26 wraparound the rear corners of the vehicle 12. FIG. 6A shows the vehicle step system 10 in a closed position, and FIG. 6B shows the vehicle step system 10 and an open position. Using a U-shaped bumper with wraparound and's increases the area of the step surface 32.

Figure 7A:
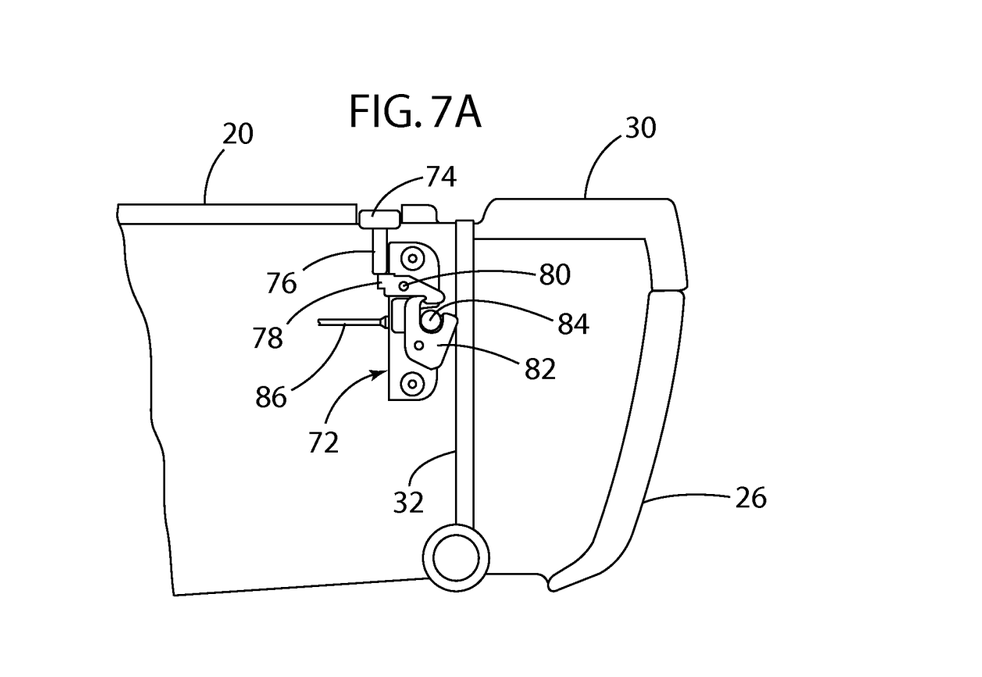
FIG. 7A is a rear view with portions removed for clarity illustrating an alternative example of the vehicle step assembly in a closed, latched position using an alternative latching mechanism.
Figure 7B:
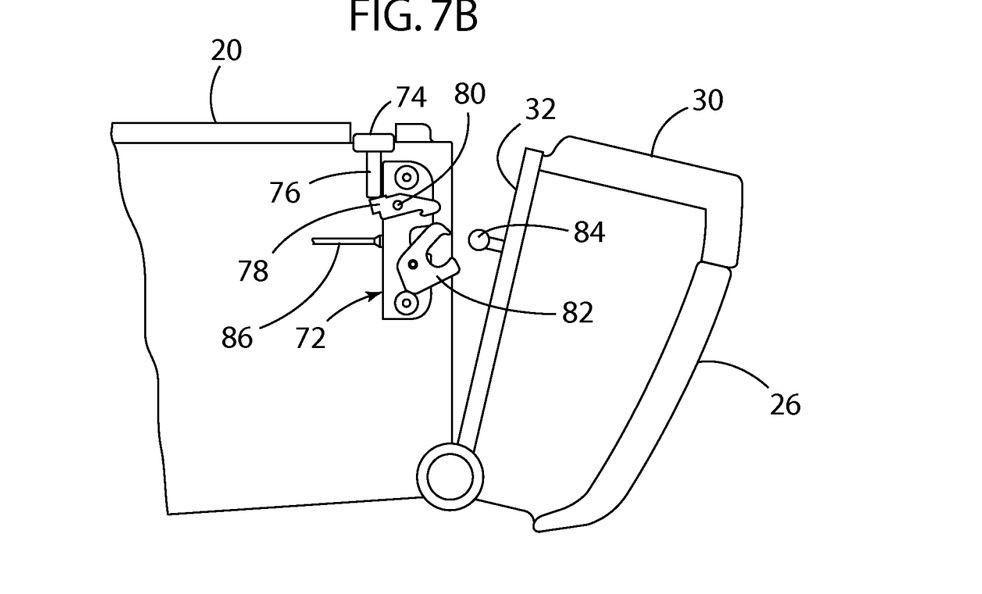
FIG. 7B is a rear view with portions removed for clarity illustrating the alternative example of the vehicle step of FIG. 7A illustrating the step in an unlatched, partially open position.

FIGS. 7A-7B show an alternative example of the vehicle step system 10. As shown, the pivotal end 26 pivots freely about the hinge 28 and manually moves from the first, closed position to the second, open position and back. In this example, the actuator 36 from the previous example is not used. However, while not shown the lever arm 42 may still be included, since the lever arm 42 even without the actuator 36 functions as a stop to limit travel of the pivotal end 26. Other types of stop mechanisms suitable for limiting movement of the pivotal end 26 may also be used. FIGS. 7a-7B illustrate a latch/release system 72 within the bumper 20 in a latch to position, see FIG. 7A and an unlatched position, see FIG. 7B. As illustrated, the latch/release system 72 includes a button 74 having a pin 76 extending downwardly from the top or upper side 20 of the bumper 18. Pressing the button 74 exerts downward pressure on a lever 78 through the pin 76. Downward pressure on the lever 78 causes the lever to rotate about the pivot point 80 and releases the latch 82. When released the latch 80 rotates in a counter-clockwise direction and releases a detent member 84 connected to the pivotal end 26 allowing the pivot end 26 to rotate to its second, open position. While the present example illustrates using a button 74 to activate the latch/release system 72, a cable 86 connected to a remote actuator (not shown) such as a lever or button, moves the lever 78 allowing the latch 82 to rotate and release the detent member 84. Further, the foregoing examples of a latch mechanism notwithstanding, various other types of latch mechanisms could secure the pivotal end 26 in the first, closed position and upon being released allow the pivotal end 26 to pivot or rotate into the second, open position.

In a further example of the present invention, the top of the vehicle bed 14 includes a handhold 90, see FIG. 1. The handhold 90 gives a user something to hold onto while pulling themselves into the vehicle 10.

The pivotal end 26 rotates about the pivot point or hinge 28 until it is at a position substantially perpendicular to the vehicle 12 thereby exposing the step surface 32. The step surface 32 may contain a gripping surface 88 to prevent slipping. The pivotal ends 26 are situated such that the tailgate 16 does not interfere with the step surface 32 since the pivotal ends 26 and correspondingly the step surfaces 32 extend beyond the range of the tailgate 16.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A vehicle step system comprising:
   a bumper having an end, said end having a top side, a bottom side and a rear face extending therebetween;
   said end of said bumper pivoting downward about an axis transverse a longitudinal axis of said bumper and movable between a first, closed position and a second, open position; and
   said second, open position having a step surface.

2. A system as set forth in claim 1 wherein said bumper includes a top; and
   in said second, open position, said step surface is positioned below said top of said bumper.

3. A system as set forth in claim 1 including a latch.

4. A system as set forth in claim 1 wherein said bumper includes a bottom; and
   said end pivotally connected to said bumper at said bottom.

5. A system as set forth in claim 1 including an actuator, said actuator connected to said end and operative to move said end between said first closed, position and said second, open position.

6. A system as set forth in claim 1 including a lever arm, said lever arm connected to said end and to an actuator.

7. A system as set forth in claim 6 wherein said actuator includes a rod; and
   a pivot pin, said pivot pin pivotally connecting said rod to said lever arm.

8. A system as set forth in claim 3 wherein said latch assembly includes a latch member;
   said end of said bumper having a detent member; and
   said latch member operative to capture said detent member to hold said end of said bumper in said first, closed position.

9. A system as set forth in claim 8 wherein said latch includes a release, said release including a retainer, said retainer engaging said latch member; and
   a button, said button connected to and operative to move said retainer thereby releasing said latch member and allowing said end of said bumper to move to said second, open position.

10. A vehicle step system comprising:
    a bumper having an end,
    said end of said bumper movable between a first, closed position and a second, open position;
    said second, open position having a step surface;
    a lever arm, said lever arm connected to said end and to an actuator, said actuator includes a rod;
    a pivot pin, said pivot pin pivotally connecting said rod to said lever arm; and
    a latch assembly, said latch assembly cooperating with said pivot pin to secure said end in said first, closed position.

11. A system as set forth in claim 10 wherein said lever arm includes an elongated slot having a first end and a second end, said pivot pin disposed in said elongated slot;
    a latch member, said latch operative to prevent movement of said lever arm when said pivot pin is disposed in said elongated slot adjacent said first end of said elongated slot.

12. A system as set forth in claim 11 including a spring, said spring coupled to said pivot pin and operative to draw said pivot pin towards said second end of said elongated slot.

13. A vehicle step system comprising:
    a bumper having a top surface and a rear face and having an end, said end having a top surface and a rear face;
    said end of said bumper pivoting downward about an axis transverse a longitudinal axis of said bumper and movable between a first, closed position wherein said top surface of said bumper and said top surface of said end are adjacent and coplanar and a second, open position wherein said top surface of said end is spaced from and extends transverse said top surface of said bumper and said rear face of said bumper and rear face of said end remain coplanar, said second, open position having a step surface;
    an actuator, said actuator connected to said end of said bumper and operative to move said end of said bumper between said first closed, position and said second, open position.

14. A system as set forth in claim 13 including a latch securing said end of said bumper in said second, closed position.

15. A system as set forth in claim 14 including a lever arm attached to said actuator and to said end of said bumper.

16. A method for forming a step for a vehicle comprising:
    providing a bumper, having a top surface, connected to said vehicle; and
    downwardly pivoting an end of said bumper about an axis transverse a longitudinal axis of said bumper and moving said end of said bumper to an open position, whereby said top surface of said end extends transverse to the top surface of the bumper, thereby exposing a step surface, said step surface positioned below a top of said bumper.

17. A method as set forth in claim 16 including the step of pivotally attaching said end of said bumper to the bumper.

18. A method as set forth in claim 16 including the step of using an actuator to move the end of said bumper to the open position, the actuator connected to the end of said bumper and to the bumper.

19. A method as set forth in claim 16 including a latch, and the step of releasing the latch prior to moving the end of the bumper to the open position.

\* \* \* \* \*